United States Patent [19]
Peters

[11] 3,746,047
[45] July 17, 1973

[54] HIGH OR LOW PRESSURE CUTOFF CONTROL VALVE

[76] Inventor: Clifford M. Peters, 16 Rockwall Drive, Longview, Tex. 75601

[22] Filed: Sept. 7, 1971

[21] Appl. No.: 178,138

[52] U.S. Cl. .............................. 137/625.66, 137/458
[51] Int. Cl. ............................................. F16k 11/00
[58] Field of Search .................. 137/492, 492.5, 488, 137/625.66, 458, 625.25

[56] References Cited
UNITED STATES PATENTS

| | | | |
|---|---|---|---|
| 3,083,726 | 4/1963 | Woelfel | 137/458 |
| 3,044,492 | 7/1962 | Peters et al. | 137/625.66 |
| 3,238,966 | 3/1966 | Howard et al. | 137/625.66 X |
| 2,803,266 | 8/1957 | Towler et al. | 137/625.66 X |
| 3,043,331 | 7/1962 | Peters | 137/492 X |

Primary Examiner—Henry T. Klinksiek
Assistant Examiner—Robert J. Miller
Attorney—Jack W. Hayden

[57] ABSTRACT

A valve for shutting off a fluid pressure medium in response to pressure variations in a flow conduit wherein a valve body with a longitudinal bore therein is provided with slide valve means in the bore. There are inlet and outlet port means in the body that communicate with the bore and resilient means tend to urge the valve means in one direction longitudinally in the bore.

Passage means in one end of the body receive pressure from the flow conduit, and plunger means is mounted in the passage means and is provided with seal means against which the pressure from the flow conduit acts to tend to move the plunger and valve against the force of the resilient means. A vent to atmosphere from the passage means and one end of the longitudinal bore in the valve body is provided so that if the seal means between the plunger and passage leaks, the pressure from the flow conduit will bypass to atmosphere. Another vent to atmosphere communicates with the other end of the bore. The outlet port means comprises two passages, one of which is adapted to be blocked, depending upon whether the valve is to be used as a high or low pressure controller.

2 Claims, 2 Drawing Figures

Patented July 17, 1973

3,746,047

Clifford M. Peters
INVENTOR

BY Jack W. Hayden

ATTORNEY

HIGH OR LOW PRESSURE CUTOFF CONTROL VALVE

CROSS REFERENCE TO RELATED APPLICATION

The present invention relates to a form of pilot valve construction which is different from that shown and claimed in my copending application Ser. No. 178,062 filed Sept. 7, 1971 for "Combination High and Low Pressure Cutoff Control Value".

BACKGROUND OF THE INVENTION

1. Field of the Invention

The present invention relates to a pilot valve which functions to control the supply of fluid pressure to another source in response to variations in pressure in a flow conduit or the like. A vent to atmosphere prevents the pressure from the conduit commingling with the fluid pressure flow which is controlled by the valve.

2. Description of the Prior Art

Various pilot valves have been proposed and are in use at the present time for controlling the flow of a pressure medium in response to pressure variations in a flow conduit, and some of such constructions are such that should a leak occur in the valve, the control pressure fluid may discharge into the pilot valve to act on the components thereon in an undesirable manner, or to commingle with the pressure medium the pilot valve controls. The prior art with which applicant is familiar includes: U.S. Pat. Nos. 1,177,864; 1,303,801; 1,574,234; 2,198,049; 2,216,973; 2,700,981; 2,731,032; 3,018,791; 3,026,904; 3,042,057; 3,043,331; 3,083,726; 3,092,136; and 3,549,208 and German Patent No. 92927.

SUMMARY OF THE INVENTION

The present invention provides a pilot valve for controlling the flow of a pressure medium in response to pressure variations in a flow conduit wherein a vent to atmosphere is provided so that if a leak occurs in the seal means which seals off the flow line pressure in the valve, such pressure will be vented to atmosphere rather than act on the internal components of the valve.

Still another object of the present invention is to provide a pilot valve construction which is relatively simple in structure and which is constructed so that it will function in response to either a predetermined maximum pressure or a predetermined minimum pressure and which incorporates vent means to vent to atmosphere pressure from a flow line conduit that acts on the pilot valve should a leak occur in the seal means which seals the flow line conduit pressure in the valve.

Another object of the present invention is to provide a pilot valve which will function properly even though components of the valve are out of longitudinal axial alignment.

Yet a further object of the present invention is to provide a pilot valve which does not require exact alignment of longitudinal bores which may be of different diameter in the valve body for proper functioning of components slidably mounted in the longitudinal bores.

Other objects and advantages of the present invention will become apparent from the following description and drawings.

DESCRIPTION OF THE PREFERRED EMBODIMENT

Figures 1, 2:
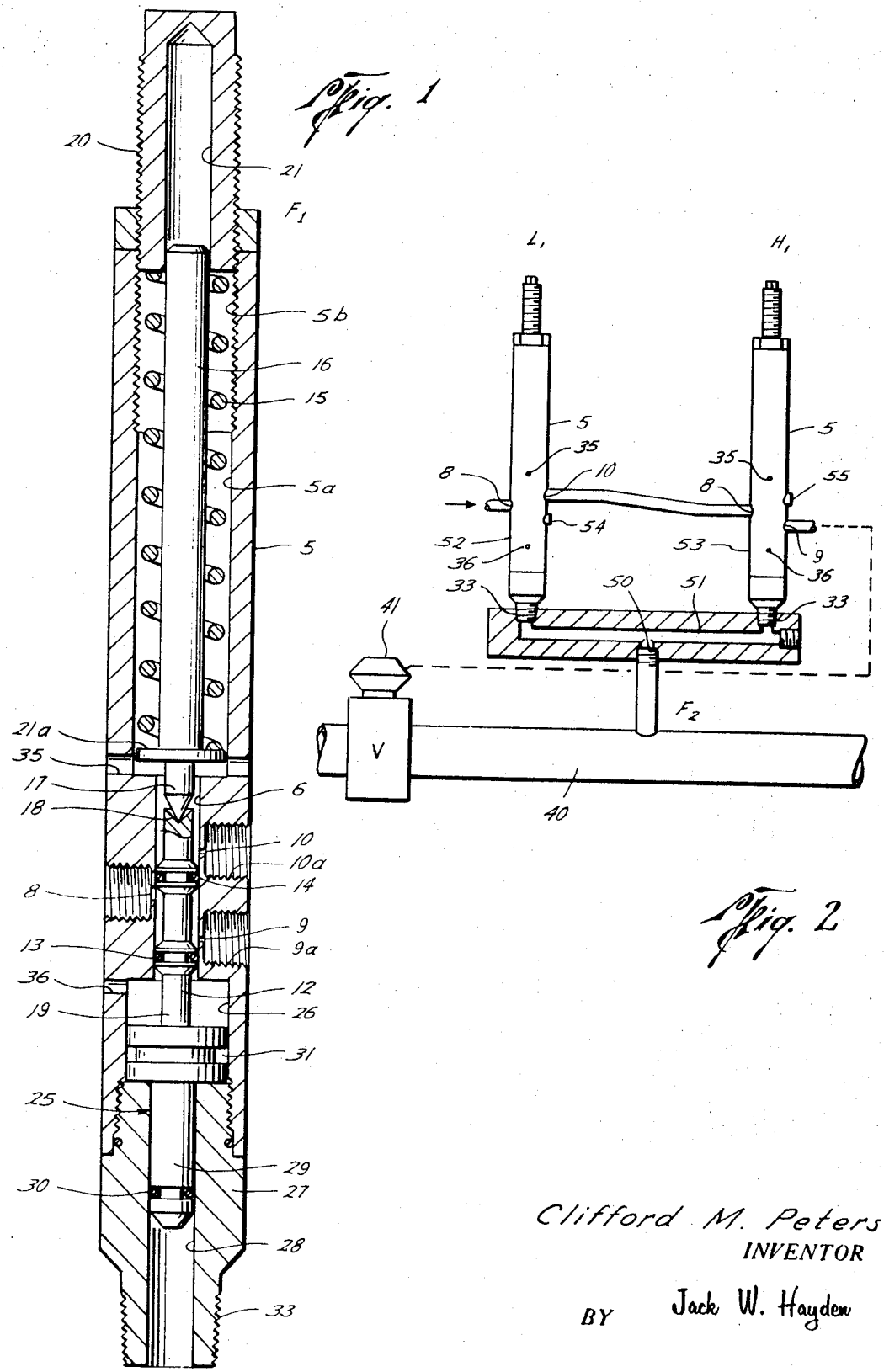
FIG. 1 is a sectional view illustrating the preferred embodiment of the present invention.
FIG. 2 is a schematic illustration showing two of the present valves, one of which is arranged to function as a cutoff when the pressure falls below a predetermined minimum and the other of which acts as a cutoff when the pressure in a flow line or conduit exceeds a predetermined maximum.

Attention is first directed to FIG. 1 of the drawings wherein a valve body 5 is shown and includes a longitudinally extending bore 6 therein.

Inlet port means 8 and outlet port means 9 and 10 are provided in the body 5 and communicate with the longitudinal bore 6. Slide valve means 12 are carried within the longitudinal bore 6 and are provided with spaced seal means 13 and 14 for controlling the flow of pressure fluid between the inlet 8 and either the outlet 9 or outlet 10, depending upon whether the valve 5 is to be used as a high pressure control or low pressure control.

Resilient means 15 are carried by the valve body 5, which resilient means 15 is shown as being in the form of a spring and surround the plunger 16, the end 17 of which is adapted to engage one end 18 of the slide valve 12. The housing 5 is provided with a suitable counterbore 5a for receiving the spring, and the end 5b of the counterbore may be threaded for receiving the nut 20 having the bore 21 therein for receiving plunger 16. One end of the spring abuts nut 20, and the other end rests on annular shoulder 21a, thus permitting a predetermined force to be maintained in the spring 15.

A longitudinal passage referred to generally at 25 is formed in the valve body 5 by means of the counterbore 26 at one end of bore 6 and plug 27 fitting in 26 and having the passage 28 formed therethrough. Provided in the passage 25 is the plunger 29 which is provided with a groove 30 and a groove 31 for receiving seal means in one of said grooves. The end 33 of the body 5 is threaded for connection to a conduit for flow from a conduit which flow acts on seal means positioned in either the groove 30 or groove 31 to tend to urge the plunger against the end 19 of the valve means and urge it against the force of the spring 15.

Specific attention is directed to the fact that the plunger 29 is not connected to the valve means 12 so that should any misalignment of the plunger 29 and valve 12 occur by reason of misalignment of the bore 6 and passage 25, such misalignment will not effect the function of the present invention.

When the valve of the present invention is to be employed so as to control the supply of fluid pressure between the inlet 8 and the outlet 10, a plug may be inserted in the threaded bore 9a to close off the outlet 9. Similarly, when the present invention is to control flow between inlet 8 and port 9, a plug may be inserted in threaded bore 10a to close off port 10. When the present invention is employed as a low pressure control, that is, when it is to shut off flow of pressure fluid through the valve when the pressure in a conduit communicated to passage 28 falls below a predetermined minimum, port 9 will be plugged. When the present invention is to be used as a high pressure control, i.e., shut off pressure fluid through the valve when the pressure in a conduit communicated with 28 exceeds a predetermined maximum, port 10 will be plugged.

FIG. 2 illustrates the present invention employed both as a high pressure and low pressure cuttoff. A flow conduit is adapted to be connected at 50 into the manifold 51 which communicates to the low pressure control valve 52 through the passage 28 therein and also to the high pressure control valve 53 through the passage 28 therein. In FIG. 2, the low pressure valve 52 has plug 54 closing off outlet 9, and high pressure valve 53 has plug 55 closing off outlet 10.

My copending application Ser. No. 178,062 illustrates schematically a flow line connected to a pilot valve. The present invention is also intended to utilize as a control fluid the flow through a conduit or the like. The pressure fluid normally maintains both valves in open position for the flow of fluid medium therethrough, but when the pressure in conduit 40 exceeds a predetermined maximum or falls below a predetermined minimum, such occurrence acts to shut off flow of pressure fluid through the pilot valves. When the flow of pressure fluid is shut off, this causes a valve, such as 41 in conduit 40 to close and shuts off flow through the conduit 40. This general function is well understood by those skilled in the art.

When the valve of the present invention is employed as a low pressure valve as shown at 52 in FIG. 2, the compression in spring 15 is set so that the valve will function as intended. Similarly, when it is employed as a high pressure cutoff pilot valve 53, the spring 15 will be adjusted accordingly.

When the valves 52 and 53 are connected into the manifold 51, the springs in each valve are thus set accordingly. For example, the pressure on the spring in valve 53 is set so that when the pressure in the flow line acting on the plunger through passage 28 is above the predetermined maximum, the plunger 29 will be forced against the valve to move it against the spring and force valve 12 and the seal means 13 thereon to a position upwardly above outlet 9 (as viewed in FIG. 1) between outlet 9 and plugged outlet 10. This moves the seal 13 to close off flow between inlet 8 and outlet 9 and also vents outlet 9 exteriorly of the valve through vent port 36 that communicates with an end of bore 6.

The spring in valve 52 is set so that should the controlled pressure in the flow line which is communicated through 28 to act on plunger 29 fall below the predetermined minimum, the spring 15 will move the plunger 29 and the valve 12 downwardly to position seal 14 between inlet 8 and outlet 10 as shown in FIG. 1 of the drawings so that communication between the inlet 8 and outlet port means 10 is cut off and outlet port means 10 may then vent to atmosphere through the vent 35 that communicates with one end of bore 6.

In FIG. 2, the pressure medium discharge from outlet 10 of low pressure valve 52 is conducted to the inlet of high pressure valve 53 where it is discharged through outlet 9 if the pressure in the conduit 40 connected to manifold 51 is within the predetermined maximum and minimum pressure ranges. If either valve 52 or valve 53 closes, the flow of pressure fluid is shut off, and the pressure is bled to atmosphere. This permits a self-closing valve mechanism, such as valve 41 in conduit 40, to close.

The vent 36 communicating with passage 25 and the end of the bore 6 also acts as a safety release in the event that the seal means arranged either in the groove 30 or 31 should become worn to the extent so as to permit the bypass of pressure from the flow line conduit through the passage 28 and around plunger 29.

When this occurs, the pressure will be discharged to atmosphere through the vent means 36.

Such venting is extremely desirable since if it were not vented, the full line flow line pressure would be exerted against the seals 13 and 14 and other components of the valve and may even function to move the valve so that communication would be established to the inlet 8 and control pressure.

The foregoing disclosure and description of the invention are illustrative and explanatory thereof, and various changes in the size, shape, and materials as well as in the details of the illustrated construction may be made without departing from the spirit of the invention.

What is claimed is:

1. An apparatus for changing the pressure applied to a pressure actuated mechanism responsive to a controlled pressure rising above a maximum value or falling below a minimum value comprising in combination:
   a. a conduit for applying pressure fluid to said mechanism;
   b. high and low pressure pilot valves connected in series in said conduit and each being actuatable to interrupt flow of the pressure fluid to said mechanism while at the same time venting said mechanism;
   c. means for individually actuating said high and low pressure pilot valves to so interrupt said flow and vent said mechanism, the high pressure pilot being so actuated upon said controlled pressure rising above said maximum value and the low pressure pilot being so actuated upon the controlled pressure falling below said minimum value; and
   d. said low pressure pilot valve having a vent between said controlled pressure and the pressure fluid flow through said low pressure pilot valve to prevent flow of said controlled pressure through said low pressure pilot valve to said mechanism.

2. The invention of claim 1 wherein said high and low pressure pilot valves include valve means, plunger means abutting one end of said valve means and responsive to the controlled pressure when the controlled pressure rises above the maximum value or falls below the minimum value for moving said valve means.

* * * * *